US006934549B2

(12) United States Patent
James et al.

(10) Patent No.: US 6,934,549 B2

(45) Date of Patent: Aug. 23, 2005

(54) METHOD AND APPARATUS FOR BROWSING OBJECTS IN A USER'S SURROUNDINGS

(75) Inventors: Brian James, Deerpark, IL (US); Phillip D. Neumiller, Lake Mary, FL (US); Peter Lei, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 340 days.

(21) Appl. No.: 10/060,642

(22) Filed: Jan. 30, 2002

(65) Prior Publication Data

US 2003/0142983 A1 Jul. 31, 2003

(51) Int. Cl.[7] ............................ H04H 1/00; H04B 7/00; H04Q 7/20; G06F 15/16

(52) U.S. Cl. .................. 455/456.3; 455/3.03; 455/41.2; 709/217; 709/219

(58) Field of Search ............................ 455/3.03, 414.2, 455/92, 456.1, 456.2, 456.3, 414.1, 422.1, 14, 41.1, 41.2, 523, 418, 419, 420; 359/237, 238, 615; 398/106, 107, 118, 121–131, 183, 115; 340/825.49, 7.48, 7.29; 709/200, 203, 217, 219, 227, 225; 345/456.1, 456.2, 456.3, 456.6; 342/44, 53, 54; 725/109, 110, 112, 113

(56) References Cited

U.S. PATENT DOCUMENTS 5,434,572 A * 7/1995 Smith .......................... 342/44
5,796,351 A * 8/1998 Yabuki .................. 340/825.69
5,844,522 A * 12/1998 Sheffer et al. .............. 342/457
5,946,083 A * 8/1999 Melendez et al. ............ 356/73
5,973,643 A * 10/1999 Hawkes et al. ............. 342/457
5,983,068 A * 11/1999 Tomich et al. ............... 455/3.1
5,999,091 A * 12/1999 Wortham .................... 340/431
6,057,910 A 5/2000 Dunne
6,097,375 A * 8/2000 Byford ....................... 345/169
6,131,067 A * 10/2000 Girerd et al. ............... 701/213
6,154,139 A * 11/2000 Heller ..................... 340/573.4
6,433,866 B1 * 8/2002 Nichols .................. 356/141.1
6,466,796 B1 * 10/2002 Jacobson et al. ........ 455/456.3
6,504,634 B1 * 1/2003 Chan et al. ................. 359/159
6,611,673 B1 * 8/2003 Bayley et al. ............. 340/10.3
6,628,671 B1 * 9/2003 Dynarski et al. ........... 370/469
2001/0034223 A1 * 10/2001 Rieser et al. ............... 455/404
2002/0002598 A1 * 1/2002 Van Allen et al. .......... 709/219
2002/0181055 A1 * 12/2002 Christiansen et al. ....... 359/159

FOREIGN PATENT DOCUMENTS

GB 2 309 523 A 7/1997
GB 2 327 565 A * 1/1999 ............ H04Q/7/22
WO WO-01/01711 A1 1/2001
WO WO-01/44831 A1 6/2001
WO WO 01/44831 A1 * 6/2001 ............. G01S/5/02
WO WO 01/88687 A1 * 11/2001 ........... G06F/3/033

OTHER PUBLICATIONS

International Search Report PCT/US02/40529 dated Apr. 1, 2003.

* cited by examiner

*Primary Examiner*—William Trost
*Assistant Examiner*—Meless Zewdu

(57) ABSTRACT

The system for browsing objects in reality that enables a user to obtain information via a wireless browser-enabled device. The browser-enabled device includes a modulated laser that is directed toward target sensors located on or near objects for which information is sought by a user. The target sensors, in turn, relay information as well as information received from the modulated laser via Internet to a wireless network that serves the browser-enabled device of the user. Information concerning the object of interest is then relayed to the browser-enabled device allowing the user to view information concerning the object.

34 Claims, 3 Drawing Sheets

METHOD AND APPARATUS FOR BROWSING OBJECTS IN A USER'S SURROUNDINGS

BACKGROUND OF THE INVENTION

The present disclosure relates to a method and apparatus for browsing objects in a surrounding area to receive information about those objects and, more particularly, picking out objects visually in immediate surroundings using optical and wireless means to obtain Internet type information concerning those objects.

In the prior art, it is known to utilize location or map information of a user containing a mobile web-enabled browsing device to obtain information concerning the user's surroundings. Such conventional location or map based technologies employ either global satellite positioning or signals between a user and a cellular/wireless provider network cell antenna to determine the locational information concerning the user. The user will then receive information typically via the cellular/wireless network concerning the users immediate surroundings, such as website information in a wireless application protocol format or any other known wireless browsing formats. Such conventional map or location based technologies, however, have limitations in that specific objects in the user's line of site in the immediate surroundings of the user may not be specifically described in information sent to the user nor does the user have a means to select particular objects of interest.

DETAILED DESCRIPTION OF THE PREFERRED EMBODIMENTS

A method and apparatus constructed in accordance with the teachings of the present invention solves limitations of the prior art where difficulty is presented in obtaining information concerning specific objects within a user's field of view. In order to solve this problem, the method and apparatus in accordance with the teachings of the present invention provide a signaling device that may be pointed at objects in a user's surroundings in order to "browse" those objects by obtaining information specific to those objects. Specifically, a user subscriber has the ability to pick out and choose specific objects that they may see in their line-of-site environment with a signaling device and receive Internet information about those objects at the signaling device. In particular, the signaling device comprises a personal wireless device, such as a cellular phone, having Internet browsing capability, such as through wireless application protocol (WAP) technology, for example. Additionally, the personal wireless device would include a laser, such as an eye-safe laser, that is used to direct a modulated laser beam to a targeting device associated with the particular object being browsed, preferably being attached to the object. The targeting device is, in turn, connected to the Internet and provides information pertinent to the particular object in which the target sensor is located to the wireless network serving the personal wireless device in order to send the information to the subscriber user. Thus, the user may browse the "real" space in which the user is located. Accordingly, location and subject specific browsing become much more convenient for the end user who simply points the signaling device toward an object in order to receive information about that object.

Figure 1:
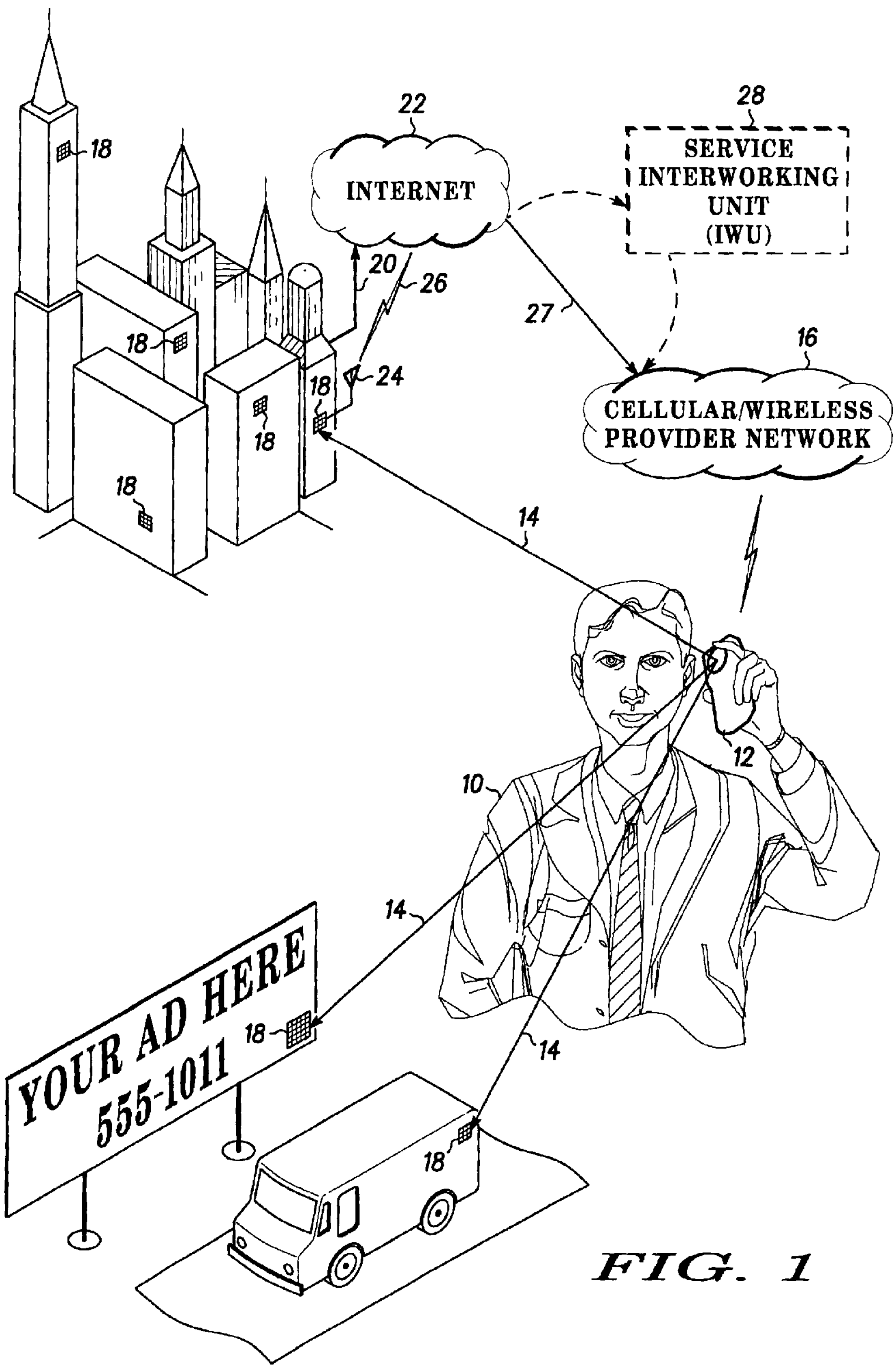
FIG. 1 illustrates a diagram of the overall system according to the teachings of the present invention.

FIG. 1 illustrates a system diagram for the method and apparatus constructed according to the teachings of the present invention. As shown, a user 10 typically utilizes a portable signaling unit 12 that is browser enabled. The signaling device 12 may be comprised of any number of known wireless devices such as a cellular phone, personal data assistant, lap top computer, web-enabled pager or any similar device capable of web-enabled browsing as well as wireless communication. Included with the signaling device 12 is a modulated laser or any other suitable optical signaling means. The modulated laser (not shown in FIG. 1) emanates a beam 14 that is capable of being directed or pointed by the user 10. Preferably, the laser is modulated to include a user identifier such as a subscriber Electronic Serial Number (ESN) or International Mobile Subscriber Identifier (IMSI) or any other suitable identifier. This identifier is used to identify the particular subscriber user within a cellular/wireless provider network 16 that provides cellular/wireless service to the signaling unit 12. Alternatively the network 16 may comprise a wide area network such as a wireless ISP or a proprietary wide area network Located on or near objects in the surroundings of the user 10 are target sensors 18 associated with the corresponding objects. As shown, these target sensors may be located on objects such as buildings, advertising billboards, vehicles or any other objects that would be of interest or pertinent to the user 10. In order to effect communication of the user identifier to any one of the target sensors 18, the user points the signaling unit 12 roughly in the direction of the desired object containing a target sensor 18 and "shoots" a modulated laser beam 14 to the target sensor 18.

Connected to the target sensor 18 may be either a hard wired connection 20 that connects the target sensor 18 to a network such as the Internet 22 or an antenna 24 that effects a wireless link 26 to the Internet 22. The purpose of these connections from the target sensor 18 to the Internet 22 is to relay the user identifier transmitted by the modulated laser as well as information specific to the object corresponding to the particular target sensor 18 on the object. Once the output signal containing at least these types of information are sent via the Internet 22 to a website and/or server (not shown) associated with the targeting sensors 18, the website via the Internet 22 relays the user identifier information as well as information specific to the selected object via a link 27 to a cellular/Wireless Provider Network 16 or similar network serving the browser-enabled signaling unit 12. Alternatively, an interface such as a service Interworking unit (IWU) 28 may be used to effect the link between the Internet 22 and the Cellular Wireless Provider Network 16 when protocols are disonant. The IWU may be comprised of any IProvider that interconnects the wireless network to the Internet (e.g., 2G, CDMA IWU, 2.5/BG CDMA PDSN, 2.5G/3G GGSN/IGSN).

Figure 2:
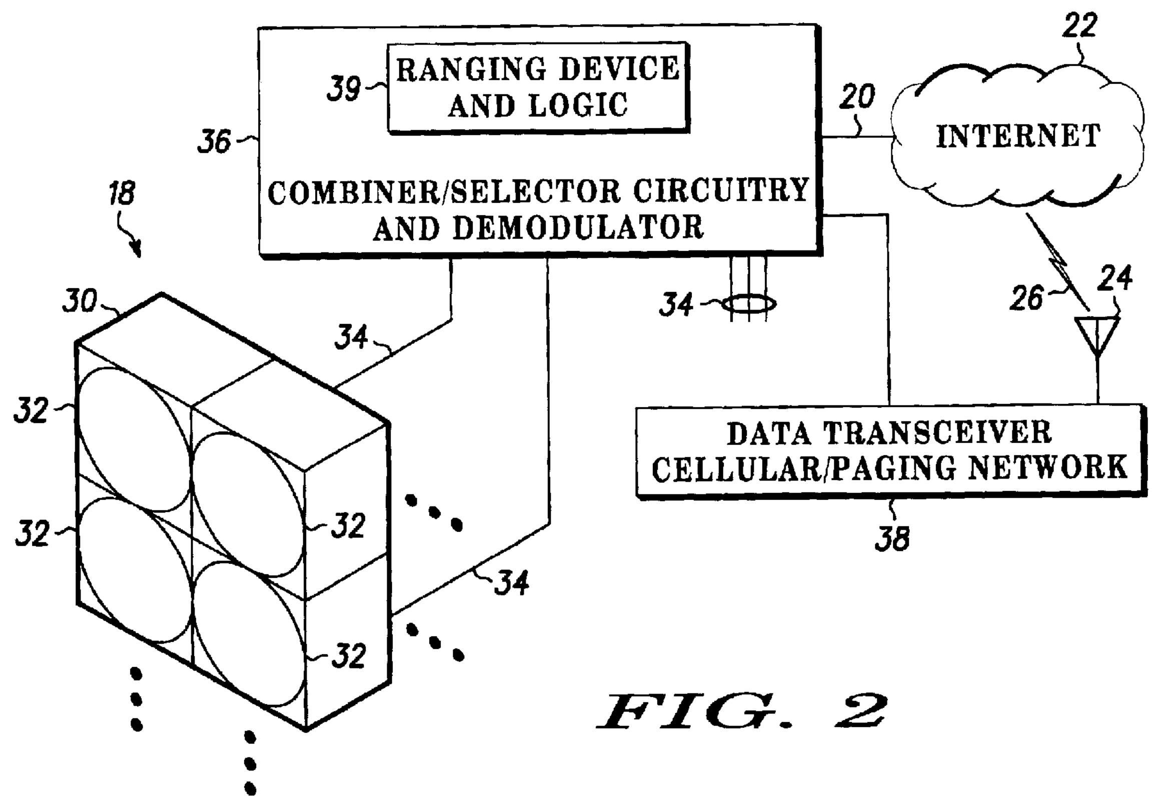
FIG. 2 illustrates a diagram of a target sensor array and connection of the array to the Internet as used in the system illustrated in FIG. 1.

Preferably, each of the target sensors is comprised of an array of optical detector modules as is shown in FIG. 2.

Specifically, the array 30 includes a plurality of specific optical detector modules 32 configured to detect and receive the modulated laser light from an incident laser beam 14 impinging on the target detector 18. The size of the array 30 is variable and the number of individual modules 32 within the array 30 may be selected to optimally detect the incident laser beam 14 dependent on the power of the laser in the signaling unit 12, prevailing atmosphere conditions, expected distance between the signaling unit 12 and the target detector 18, or any other conditions that may affect reception of the laser beam 14 by the target sensor 18.

Figure 3:
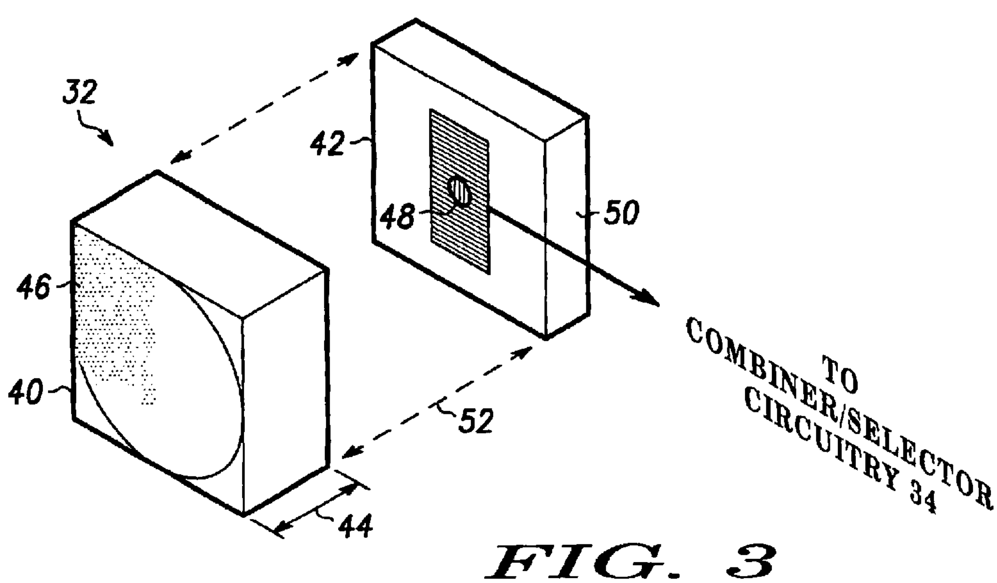
FIG. 3 illustrates an expanded three-dimensional view of a target sensor module employed in the sensor array of FIG. 2.

FIG. 3 illustrates an exemplary configuration of an optical detector module 32. The module 32 includes an optical lens 40 and a photo detector circuit 42. The optical lens 40 is preferably a Fresnel lens having a focal length that is equal to the thickness 44 of the lens 40. An example of a typical Fresnel lens that may be used as a 2.3 inch square lens having a focal length of 1.2 inches, but the teachings of the present invention are not limited to such. Behind the lens 40 is a photo detector 42 having a photo detector circuit 48 disposed on a substrate 50. The photo detector circuit 48 is, in turn, connected to the combiner/selector circuitry 36 as shown in FIG. 2 via connection line 34. As indicated by dashed arrows 50, the lens 40 is joined to the photo detector 42 to form the optical detector module 30. Additionally, the lens 40 may include a protective coating 46 that allows light of a certain wavelength to pass to the lens detector 40.

The function of the combiner/selector circuitry 36 shown in FIG. 2 is to receive all the signals from the optical detector modules 32 within the optical detector array 30. This to circuitry 36 detects any and/or all modulated laser light signals that pass through the lenses 40 of the optical detector modules 32 and impinge on the photodetector circuitry 48, thereby causing a signal to ensue. The combiner/selector circuitry 36 may also include a demodulator that is used to demodulate the modulated laser beam 14 in order to obtain the user identifier information. However, the modulated signal may alternatively be passed by the combiner/selector circuitry 36 to the Internet website, which alternatively could determine the user identifier.

The combiner/selector circuitry 36 may also be configured to detect the number of times the modulated laser beam 14 impinges on the optical detector array. This information can, in turn, be used by the combiner/selector circuitry 36 to discriminate between a merely stray laser signal 14 that a user 10 has not intended to impinge on the target sensor 18 and those laser signals that have been intentionally directed at the target sensor array 18. This may be accomplished by setting a prescribed number of "hits" that must be picked up by the target sensor 18 from a particular signaling unit 12 and only rendering acceptance of the user identifier when the prescribed number of "hits" has occurred. Hence, errors due to stray laser beams 14 impinging on a target sensor 18 may be guarded against. The combiner/selector circuitry 36 may be located within the target sensor 18 or near the sensor 18. The circuitry 36 is, in turn, connected by hard wired connection 20 or, alternatively, may be connected to a data transceiver for a cellular/paging network 38 that communicates via antenna 24 and wireless connection 26 to the Internet 22.

Additionally, the combiner/selector circuitry 36 illustrated in FIG. 2 may have an associated ranging logic 39 and range device that may be employed by the target sensor 18. The range device is used to determine the distance between the target sensor 18 and the signaling unit 12 transmitting the laser beam 14. Once the distance is determined, the ranging logic determines whether the signaling unit 12 is within a tolerance range distance. If the signaling unit is within the tolerance range, access is afforded to the signaling unit. Otherwise access by the signaling unit 12 issuing a laser beam 14 impinging on the target sensor 18 is denied access. This range determination and accompanying decision logic can be employed to further ensure that stray incident laser beams impinging on the target sensor 18 are not registered in order to ensure that a user 10 is close enough to the target sensor 18 to intend to receive information concerning the corresponding object to which the target sensor 18 is associated.

Turning back to FIG. 1, the Internet website, as discussed previously, may alternatively communicate via the Internet 22 to a service Interworking unit (IWU) 28. The purpose of this IWU 28 is to interface the Internet site, typically utilizing an IP protocol, with a cellular/wireless provider network 16 that utilizes a different protocol or similar protocol to provide IP-like services when full IP service is not available or desirable, such as a WAP protocol, for communication with a browser-enabled wireless device (e.g., the signaling unit 12). The website accessed by the Internet 22 that is associated with the target sensors 18 uses the user identifier that has been demodulated from the modulated laser beam 14 to identify the particular subscriber user 10. This may be done by the IWU or via access to a website associated with the cellular/wireless provider network 16 via IP protocol across link 27. Additionally, the information specific to the object corresponding to the particular selected target sensor 18 is received. Typically, this information need only be a URL address for a website pertaining to the particular object, but further information could be included as desired. Once this information has been received by the website located on the Internet 22, an IP protocol signal containing the information is output from the website to the IWU 28.

Upon receiving the IP signal, the IWU 28 translates the IP format signaling to a format recognized by the cellular/wireless provider network 16 so that the information may be transmitted to the signaling unit 12. As mentioned previously, this information nominally includes the user identifier as well as the URL of the associated object. Once this signal has been received at the cellular/wireless provider network 16, the network 16 determines, based on the user identifier, the user's last known cell registration, and/or the detector's known cell, which particular cell of the network 16 that the signaling unit 12 is located in based on well known methods of cellular/wireless communication. Once the signaling unit 12 is located, the cellular/wireless provider network 16 relays the URL information to the signaling unit 12. Once this information is received, the user 10 may select to browse the particular website associated with the URL or review any other information that may be included as desired using any known protocols for wireless browsing such as WAP.

Figure 4:
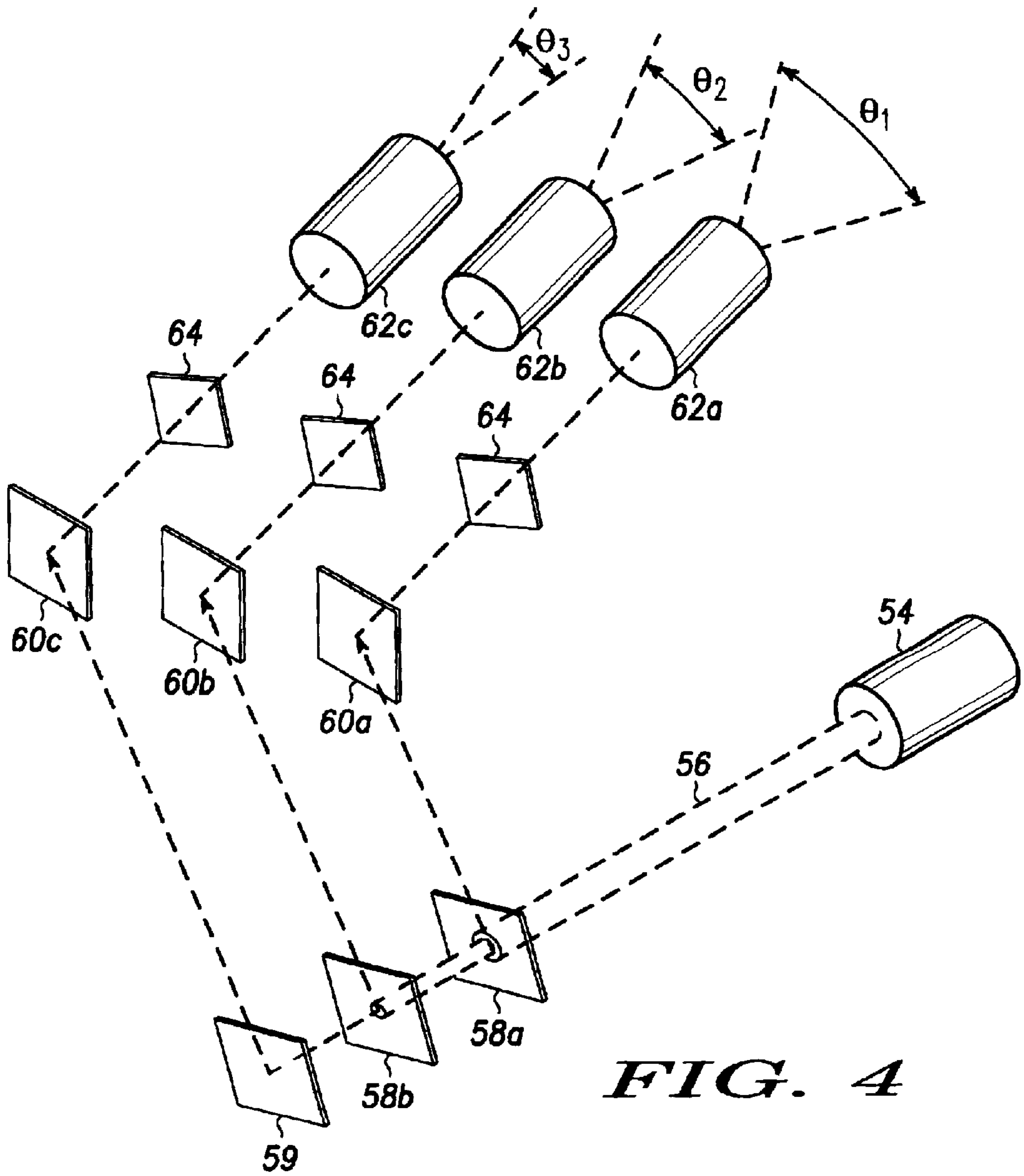
FIG. 4 illustrates a diagram of a laser system employed in the signaling unit according to the teachings of the present invention.

As discussed previously, a laser is disposed on or within the signaling unit 12 (not shown in FIG. 1). An exemplary embodiment of the optical configuration of the laser system is illustrated in FIG. 4. In this embodiment, a beam emitted from a laser is split into a plurality of different beams that are respectively directed to different beam expander optical systems in order to achieve a plurality of distance settings for the emitted laser beam. In particular, an originating laser 54 is shown that emits a laser beam 56. This beam 56 is directed to an array of beam splitters 58 and a mirror 60. A first beam splitter **58*a* splits off a portion of the first beam, which is directed to a mirror 60*a* that, in turn, reflects the beam to a beam expander optical system 62*a*. A second beam splitter 58***b* splits a portion of the remainder of the beam passed from beam splitter 58*a* to a second mirror 60*b* that, in turn, directs the beam to a beam expander optical system 62*b*. A mirror 59 receives the final remaining portion of the beam 56 that is passed by beam splitters 58*a* and 58*b* and directs this remainder to a mirror 60*c*, which, in turn, reflects the beam to a beam expander optical system 62*c*. Each of the optical systems 62*a*–62*c* have a respective dispersion angle (e.g., angles $\theta_1$, $\theta_2$, and $\theta_3$). These angles achieve specific light dispersions that are useful respectively for long-range, mid-range and near-range distances.

As an alternative, the laser system of FIG. 4 may also employ beam control devices 64 to that prevent the light beam reflected by the mirrors 60 to be passed to the optical systems 62. The light switches 64 may be either mechanical, such as a shutter, or by any other known means that can alternately switch light transmission. Furthermore, these light switches 64 may be manually selected on and off by the user in order to allow the user to select a particular range distance or may be controlled by an internal logic (not shown) based on ranging information passed from the ranging logic 39 (see FIG. 2) that is delivered to the signaling unit 12 via the Internet 24, the IWU 28 and the cellular/wireless provider network 16.

Figure 5:
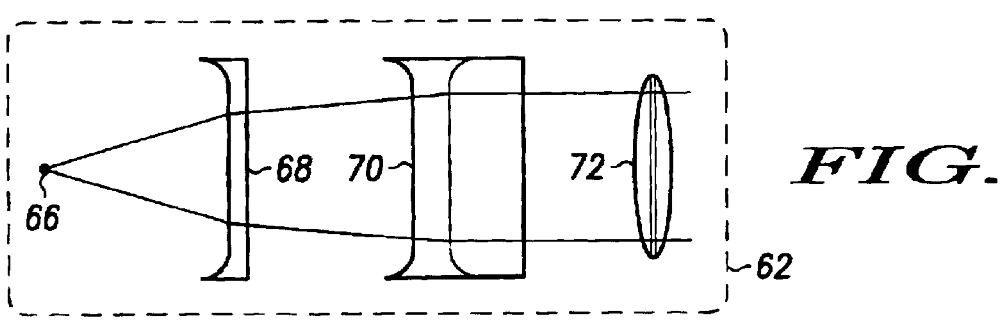
FIG. 5 illustrates an exemplary optics configuration employed in the laser of FIG. 4.

FIG. 5 illustrates an exemplary arrangement of optics used in the optical systems 62 shown in FIG. 4. As may be seen in FIG. 5, the input laser light (shown as point 66) is first passed through a dispersive lens 68. The light then is directed through a second focusing lens 70 that produces a collimated output beam 72. Dependent on the particular focal lengths, the different dispersion angles illustrated in FIG. 4 may be achieved for differing range distances. It is noted that the optical system illustrated FIG. 5 is merely exemplary and any one of numerous optical systems known to those skilled in the art may be employed.

A further feature that can be employed in the present system is transmission of an acknowledgment signal to the signaling unit 12 within a short pre-determined time period in order to provide the user with an indication that the target sensor has indeed received the user identifier. This may be accomplished by directing the cellular/wireless provider network 16 to send an acknowledgment signal having higher priority than the URL or other information associated with the object that is to be sent to the signaling unit 12. Additionally, the time period may be minimized by giving the user identifier information priority over the object information when sent via the Internet 24 and the IWU 28. That is, the user identifier information is to be sent prior to the object information in order to afford the shortest possible time period for sending the acknowledgment signal to the user 10.

The system and method in accordance with the teachings of the present invention may be employed, as previously described by placing target sensors on objects such as buildings, advertising billboards, vehicles, etc. Other uses may include inventory systems where shelving or bins holding inventory items may have an associated target sensor disposed thereon or nearby. Other applications may include tourist attractions where a target sensor is either placed on or near a tourist attraction, site or object of interest. Notwithstanding, the conceivable applications of the apparatus and method constructed in accordance with the teachings of the present invention are numerous and may be employed in a multitude of applications.

While the present disclosure is considered to be the most practical and preferred embodiment, it is to be understood that the disclosure is not limited to such, but is intended to cover various modifications and arrangements included within the spirit and scope of the appended claims.

What is claimed is:

1. An apparatus for browsing objects located in a surrounding area comprising:

a signaling unit configured to transmit a user identifier via a first medium, the signaling unit comprising a browser enabled device selected from the group consisting of a mobile telephone, a personal data assistant, a laptop computer and a mobile pager; and one or more target sensors with each sensor corresponding to an object, the one or more target sensors configured to receive the user identifier and send an output signal containing the user identifier and information specific to the corresponding object to a site located within a first network;

wherein the site within the first network identifies a second network in communication with the signaling unit based on the user identifier and transmits the information signal with information particular to the object corresponding to the target sensor to the second network, wherein the second network relays the information particular to the object to the signaling unit.

2. The apparatus according to claim 1, further comprising:

an intefface unit configured to receive output signals from the one or more sensors and outputs an information signal to a second network in communication with the signaling unit.

3. The apparatus according to claim 2, wherein the interface is comprised of an Interworking Unit.

4. The apparatus according to claim 1, wherein the first medium is optical transmission.

5. The apparatus according to claim 4, wherein optical transmission is effected by a modulated laser disposed in the signaling unit.

6. The apparatus according to claim 1, wherein one or more target sensors each comprise an array of optical detector modules.

7. The apparatus according to claim 6, wherein each optical detector module comprises an optical lens and a photodetector circuit.

8. The apparatus according to claim 7, wherein the optical lens is a Fresnel lens.

9. The apparatus according to claim 1, wherein the sensor is disposed on or near the corresponding object.

10. The apparatus according to claim 1 wherein the identifier is comprises at least one of a subscriber's electronic serial number and International mobile subscriber identifier.

11. The apparatus according to claim 1, wherein the second network is one of a cellular/wireless telephone network and a wide area network.

12. A method for browsing objects in a surrounding area, the method comprising:

transmitting a user identifier from a signaling unit via a first medium, the signaling unit is comprised of a browser enabled device, wherein the browser enabled device is selected from the group consisting of a mobile telephone, a personal data assistant, a laptop computer and a mobile pager;

sensing the user identifier using one or more target sensors with each sensor corresponding to an object, wherein the one or more target sensors are configured to receive the user identifier and send an output signal containing the user identifier and information specific to the corresponding object to a site located on a first network;

identifying within the site a second network in communication with the signaling unit based on the user identifier contained within the output signal and transmitting the user identifier and an information signal to the second network from the site; and transmitting the information signal via the second network to the signaling unit, wherein the information signal includes information particular to the object corresponding to the target sensor sending the output signal.

13. The method according to claim 12, wherein the first medium is optical transmission.

14. The method according to claim 13, wherein optical transmission is effected by a modulated laser disposed in the signaling unit.

15. The method according to claim 12, wherein the one or more target sensors each comprise an array of optical detector modules.

16. The method according to claim 15, wherein each optical detector modules comprises an optical lense and a photodetector circuit.

17. The method according to claim 16, wherein the optical lens is a Fresnel lens.

18. The method according to claim 12, wherein the sensor is disposed on or near the corresponding object.

19. The method according to claim 12, wherein the identifier is comprised of at least one of a subscriber's electronic serial number and international mobile subscriber identifier.

20. The method according to claim 12, wherein the second network is at least one of a cellular/wireless telephone network and a wide area network.

21. An apparatus for browsing objects located in a surrounding area comprising:

a signaling unit configured to transmit a user identifier via a first medium;

one or more target sensors with each sensor corresponding to an object, the one or more target sensors configured to receive the user identifier and send an output signal containing the user identifier and information specific to the corresponding object to a site located within a first network;

a range device associated with the target sensor and configured to determine a distance between the signaling unit and the target sensor; and a logic to determine when the signaling unit is within a tolerance range distance and allow access by the signaling unit when the signaling unit is within the tolerance range and block access when the signaling unit is beyond the tolerance range;

wherein the site within the first network identifies a second network in communication with the signaling unit based on the user identifier and transmits the information signal with information particular to the object corresponding to the target sensor to the second network, wherein the second network relays the information particular to the object to the signaling unit.

22. An apparatus for browsing objects located in a surrounding area comprising:

a signaling unit configured to transmit a user identifier via a first medium, the signaling unit comprising a laser;

a laser controller configured to direct a beam of light emitted by the laser into a plurality of distance settings having respective light dispersion ranges; and one or more target sensors with each sensor corresponding to an object, the one or more target sensors configured to receive the user identifier and send an output signal containing the user identifier and information specific to the corresponding object to a site located within a first network;

wherein the site within the first network identifies a second network in communication with the signaling unit based on the user identifier and transmits the information signal with information particular to the object corresponding to the target sensor to the second network, wherein the second network relays the information particular to the object to the signaling unit.

23. The apparatus according to claim 22, wherein the plurality of distance settings includes a near-range distance, a mid-range distance and a long-range distance.

24. The apparatus according to claim 22, wherein the laser controller utilizes one of a plurality of beam expander optical systems to respectively achieve the plurality of distance settings.

25. The apparatus according to claim 24, wherein the laser controller comprises a plurality of beam splitters and mirrors that split a light beam emitted by the laser and direct corresponding beams to the plurality of beam expander optical systems.

26. An apparatus for browsing objects located in a surrounding area comprising:

a signaling unit configured to transmit a user identifier via a first medium, the signaling unit comprising a browser enabled device selected from the group consisting of a mobile telephone, a personal data assistant, a laptop computer and a mobile pager; and one or more target sensors with each sensor corresponding to an object, the one or more target sensors configured to receive the user identifier and send an output signal containing the user identifier and information specific to the corresponding object to a site located within a first network;

wherein the site within the first network is configured to send an acknowledgment signal to the signaling unit via the second network within a predetermined time period in order to provide an indication to a user that the target sensor has received the identifier and the site within the first network identifies a second network in communication with the signaling unit based on the user identifier and transmits the information signal with information particular to the object corresponding to the target sensor to the second network, wherein the second network relays the information particular to the object to the signaling unit.

27. An apparatus for browsing objects located in a surrounding area comprising:

a signaling unit configured to transmit a user identifier via a first medium; and one or more target sensors with each sensor corresponding to an object, the one or more target sensors configured to receive the user identifier and send an output signal containing the user identifier and information specific to the corresponding object to a site located within a first network;

wherein site on the first network is configured to determine whether the target sensor has received the identifier from the signaling unit for a prescribed number of times, wherein when the identifier is not yet received for the prescribed number of times, acceptance of the identifier is not rendered until the prescribed number of times has been attained and wherein the site within the first network identifies a second network in communication with the signaling unit based on the user identifier and transmits the information signal with information particular to the object corresponding to the target sensor to the second network, wherein the second network relays the information particular to the object to the signaling unit.

28. A method for browsing objects in a surrounding area, the method comprising:

transmitting a user identifier from a signaling unit via a first medium;

sensing the user identifier using one or more target sensors with each sensor corresponding to an object, wherein the one or more target sensors are configured to receive the user identifier and send an output signal containing the user identifier and information specific to the corresponding object to a site located on a first network;

determining a distance between the signaling unit and the target sensor;

determining when the signaling unit is within a tolerance range distance; and allowing access by the signaling unit when the signaling unit is within the tolerance range and blocking access when the signaling unit is beyond the tolerance range;

identifying within the site a second network in communication with the signaling unit based on the user identifier contained within the output signal and transmitting the user identifier and an information signal to the second network from the site; and transmitting the information signal via the second network to the signaling unit, wherein the information signal includes information particular to the object corresponding to the target sensor sending the output signal.

29. A method for browsing objects in a surrounding area, the method comprising:

transmitting a user identifier from a signaling unit via a first medium, the signaling unit comprising a laser and a laser controller configured to direct a beam of light emitted by the laser into a plurality of distance settings having respective light dispersion ranges;

sensing the user identifier using one or more target sensors with each sensor corresponding to an object, wherein the one or more target sensors are configured to receive the user identifier and send an output signal containing the user identifier and information specific to the corresponding object to a site located on a first network;

identifying within the site a second network in communication with the signaling unit based on the user identifier contained within the output signal and transmitting the user identifier and an information signal to the second network from the site; and transmitting the information signal via the second network to the signaling unit, wherein the information signal includes information particular to the object corresponding to the target sensor sending the output signal.

30. The method according to claim 29, wherein the plurality of distance settings includes a near-range distance, a mid-range distance and a long-range distance.

31. The method according to claim 29, wherein the laser controller utilizes a plurality of beam expander optical systems to respectively achieve the plurality of distance settings.

32. The method according to claim 31, wherein the laser controller comprises a plurality of beam splitters and mirrors that split a light beam emitted by the laser and direct corresponding beams to the plurality of beam expander optical systems.

33. A method for browsing objects in a surrounding area, the method comprising:

transmitting a user identifier from a signaling unit via a first medium;

sensing the user identifier using one or more target sensors with each sensor corresponding to an object, wherein the one or more target sensors are configured to receive the user identifier and send an output signal containing the user identifier and information specific to the corresponding object to a site located on a first network, wherein the site located on the first network is configured to send an acknowledgment signal to the signaling unit via the second network within a predetermined time period in order to provide an indication to user that the target sensor has received the identifier;

identifying within the site a second network in communication with the signaling unit based on the user identifier contained within the output signal and transmitting the user identifier and an information signal to the second network from the site; and transmitting the information signal via the second network to the signaling unit, wherein the information signal includes information particular to the object corresponding to the target sensor sending the output signal.

34. A method for browsing objects in a surrounding area, the method comprising:

transmitting a user identifier from a signaling unit via a first medium;

sensing the user identifier using one or more target sensors with each sensor corresponding to an object, wherein the one or more target sensors are configured to receive the user identifier and send an output signal containing the user identifier and information specific to the corresponding object to a site located on a first network, wherein the site located on the first network is configured to determine whether the target sensor has received the identifier from the signaling unit for a prescribed number of times, and wherein when the identifier is not yet received for the prescribed number of times, acceptance of the identifier is not rendered until the prescribed number of times has been attained;

identifying within the site a second network in communication with the signaling unit based on the user identifier contained within the output signal and transmitting the user identifier and an information signal to the second network from the site; and transmitting the information signal via the second network to the signaling unit, wherein the information signal includes information particular to the object corresponding to the target sensor sending the output signal.

* * * * *